United States Patent Office 3,340,290
Patented Sept. 5, 1967

3,340,290
1-CYANO-4-HYDROCARBYLBICYCLO[2.1.1]HEX-ANES AND PROCESS OF PREPARATION
Elwood P. Blanchard, Jr., Wilmington, Del., assignor to E. I. du Pont de Nemours and Company, Wilmington, Del., a corporation of Delaware
No Drawing. Filed June 11, 1964, Ser. No. 374,256
12 Claims. (Cl. 260—464)

This invention is concerned with a new group of polycyclic hydrocarbon compounds and with a process for their preparation. More particularly, this invention relates to new bicyclo[2.1.1]hexane derivatives and to a process for preparing same.

The products of this invention can be represented by the formula (I)
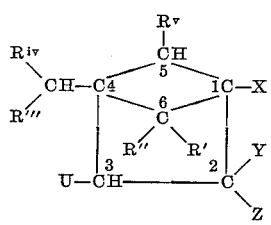

wherein R', R'', R''', $R^{iv}$ and $R^v$ are hydrogen or aliphatically saturated hydrocarbyl groups of 1–18 carbon atoms, i.e., $C_1$–$C_{18}$ hydrocarbyl groups which are free of aliphatic carbon-to-carbonate unsaturation, viz., alkyl groups, cycloalkyl groups, arylhydrocarbon groups, alkarylhydrocarbon groups or aralkylhydrocarbon groups. Thus, any unsaturation in the R substituents is aromatic type unsaturation.

In the above formula the arabic numbers 1–6 are present only to show the numbering system for this bicyclic molecule.

It is obvious that aliphatically saturated hydrocarbyl groups containing 12 or fewer carbon atoms, particularly those containing 6 or fewer carbon atoms, are least expensive and most available, and to that extent preferred. But there is to be no question of the operability of, or of the intent to include and disclose, any hydrocarbyl group whatsoever as long as it is free of aliphatic carbon-to-carbon unsaturation and contains 18 or fewer carbon atoms. Also preferred are those compounds in which R''', $R^{iv}$ and $R^v$ are hydrogen.

Illustrative hydrocarbyl groups included within the present invention are alkyl groups such as methyl, ethyl, tertiary butyl, hexyl, isooctyl, dodecyl, octadecyl, and the like; cycloalkyl groups such as cyclopropyl, cyclobutyl, cyclopentyl, cyclohexyl, cyclooctyl, methylcyclohexyl, 3,5-dicyclohexylcyclohexyl, cyclooctadecyl, and the like; aryl groups such as phenyl, naphthyl, anthryl, p-biphenylyl, p,p'-triphenylyl, naphthacenyl, benzanthryl, chrysenyl, and the like; alkaryl groups such as p-tolyl, p-cumenyl, 2,4,6-tributylphenyl, 9,10 - diethyl-1-anthryl, 6-methyl-2-naphthyl, and the like; and aralkyl groups such as benzyl, phenethyl, diphenylmethyl, α-naphthylethyl, 2-(2-anthryl)ethyl, 4-(2-anthryl)butyl, and the like.

In the above formula, X is cyano (CN).

Y in the above formula is hydrogen, hydrocarbyl (preferably of at most 12 carbon atoms and free of acetylenic and allenic unsaturation, e.g., lower alkyl, lower alkenyl, phenyl, lower alkylphenyl, etc.), lower alkoxy-hydrocarbyl (preferably lower alkoxyphenyl), di(lower alkyl)-amino, cyano, carboxyl (COH), carboxylate salt (COOM), halocarbonyl (CO-Hal), hydrocarbyloxycarbonyl (COOQ), carbamoyl ($CONH_2$), hydrocarbylcarbamoyl (CONHQ), dihydrocarbylcarbamoyl (CONQQ'), or lower alkylcarbonyloxy, wherein M represents one equivalent of a cation, e.g., a metal ion, or the unsubstituted ammonium ion; Hal represents a halogen atom; and Q and Q' are the same or different and represent hydrocarbyl groups, preferably $C_1$–$C_{12}$ aliphatically saturated hydrocarbyl groups and most preferably lower alkyl groups. Illustrative are ethyl, isobutyl, phenyl, m-tolyl, α-naphthyl, cyclohexyl and dodecyl groups. Q and Q' can be joined together to form a divalent alkylene (preferably lower alkylene) group, e.g., tetramethylene, hexamethylene, etc. Preferred Y substituents are those containing 12 or fewer carbon atoms.

Also in Formula I, U represents hydrogen, lower alkyl (e.g., methyl, propyl, isohexyl, etc.), or cyano provided that Y is cyano. Preferably, U is hydrogen.

Z in Formula I can be hydrogen or a lower alkyl group. When Y is hydrogen or di(lower alkyl)amino, U and Z can be joined together to form a divalent alkylene radical, preferably a divalent lower alkylene radical.

By the term "metal ion' 'is meant the ionic form of an alkali metal or alkaline-earth metal, especially those of atomic numbers up to and including 56. The preferred metal ions are those of the alkali metals because of their more ready availability.

The term "hydrocarbyl," as used throughout the present specification and claims, in synonymous with the term "hydrocarbon radical." This is consistent with accepted chemical naming of organic radicals, e.g., alkyl, alkenyl, aryl, etc. Thus, the hydrocarbyl groups represented by R', R'', R''', $R^{iv}$ and $R^v$ in the starting materials and products of this invention can be any radical which is aliphatically saturated, e.g., free of aliphatic carbon-to-carbon unsaturation, and which consists of hydrogen and 18 or fewer carbon atoms.

The process of this invention comprises reacting a bicyclo[1.1.0]butane compound of the formula (II)
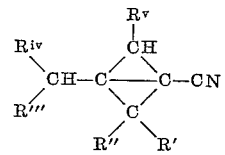

with an ethylenically unsaturated compound of the formula (III)
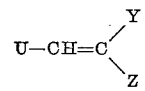

wherein R', R'', R''', $R^{iv}$, $R^v$, U, and Z are defined as above and Y is hydrogen, hydrocarbyl groups of from 1 to 12 carbon atoms free of acetylenic and allenic type unsaturation, lower alkoxyhydrocarbyl groups free of acetylenic and allenic type unsaturation, di(lower alkyl) amino, cyano, lower alkoxycarbonyl and lower alkylcarbonyloxy. When the compound of Formula III can have geometric (cis and trans) isomers, either isomer can be used, as shown in Examples VII and VIII below.

The products of this invention wherein X (and optionally U and Y) are COOH or COOM can be prepared by performing an acid or alkaline hydrolysis reaction on the products in which X is CN. This hydrolysis can be accomplished by procedures well known in the art applied to the just-indicated compounds.

The products wherein X is COOH or CN can be converted, in turn, to the corresponding compounds wherein X (and optionally U and Y) are CO-Hal, COOQ, $CONH_2$, CONHQ or CONQQ' by conventional techniques of acid-halide formation, esterification, and amidation.

The reaction between a bicyclo[1.1.0]butane of Formula II and an ethylenically unsaturated compound of Formula III can be carried out using a wide variation of reactant ratios. In general, the desired ratio is to be determined by the stoichiometry involved and by one's preference to have some particular reactant consumed completely. Since the ethylenically unsaturated compounds of Formula III are usually more readily available in commercial channels than are the bicyclo[1.1.0]butanes of Formula II, the molar ratio of the former reactant to the latter reactant is at least 1:1, and is frequently between 1:1 and about 10:1, thereby insuring complete consumption of the bicyclobutane.

When the ethylenic compound is one capable of thermal addition polymerization, it is advantageous to employ a catalytic amount of polymerization inhibitor. Hydroquinone and phenothiazine are illustrative of compounds whose use is well-known in the art for this purpose.

The temperature for this reaction can be in the range from 100° C. to 250° C.; temperatures between 100° C. and 200° C. are most preferred.

Atmospheric, subatmospheric and superatmospheric pressures may be used, but atmospheric pressure is preferred for reasons of convenience and ease of operation. Atmospheric pressure is especially preferred when liquid reactants are employed. However, when the ethylenic compound is a gas under reaction conditions, the speed of the reaction is greatly increased by using superatmospheric pressures, including pressures up to 3000 atm. and higher.

Under optimum conditions of molar ratio, temperature and pressure, the time for the reaction is generally about four to ten hours. However, the time may be as short as about one hour or as long as about twenty-four hours.

Generally, the properties of the new products of this invention are dependent in part on the nature of the substituent(s) present. For example, all are stable to air and water except those bearing reactive functional substituents such as the halocarbonyl group. The compounds are usually distillable liquids, except that when Y is COOH, the compounds are usually recrystallizable solids. Thus, the products of this invention are isolated from the remaining reaction mixture by standard techniques such as distillation, crystallization, or sometimes by picrate formation, the choice of method depending, for the most part, upon the physical characteristics of the product in interest.

The following examples describe various embodiments of the invention in greater detail. It is to be understood that these embodiments do not comprise the entire invention, but are intended rather to be illustrative of a broader inventive concept for which protection by the patent laws is being sought. The invention in its broader context finds supporting disclosure throughout the entire specification, not in the examples alone.

EXAMPLE I

*1-cyano-4-methylbicyclo[2.1.1]hexane*

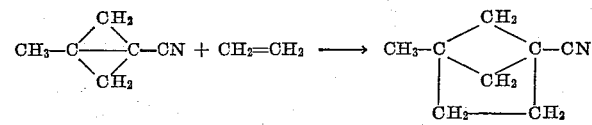

In a 200-ml. stainless-steel shaker tube, 50 g. of 1-cyano-3-methylbicyclo[1.1.0]butane was pressured with ethylene at 155° C. and about 2800–3000 atmospheres for 16 hours, with repressuring as necessary. The shaker tube was cooled, and excess ethylene was allowed to escape. The residual liquid was combined with the corresponding liquid product from another, similar run, and the mixture was distilled, to give 14.5 g. of 1-cyano-4-methylbicyclo[2.1.1]hexane, B.P. 72° C./16 mm.

*Analysis.*—Calcd. for $C_8H_{11}N$: C, 77.24%; H, 9.15%; N, 11.56%. Found: C, 77.36%, 77.44%; H, 9.11%, 9.05%; N, 11.38%, 11.56%.

VARIOUS MODIFICATIONS AND EQUIVALENTS OF EXAMPLE I

| Substituted 1-cyanobicyclo[1.1.0]butane | Ethylenically Unsaturated Compound |
|---|---|
| 3-methyl- | Isobutylene. |
| 3-isopropyl- | Propylene. |
| 2-(n-butyl)-3-(9-heptadecyl)-2-methyl- | Ethylene. |
| 2-dodecyl-3-methyl-4-phenyl- | Do. |
| 2-(1-naphthyl)-2-phenyl-3-(1-phenyl-1-p-tolyl)methyl- | Do. |
| 3-methyl- | 2-butene. |

EXAMPLE II

*1-cyano-2-dimethylamino-4-methyl-2,3-trimethylene-bicyclo[2.1.1]hexane*

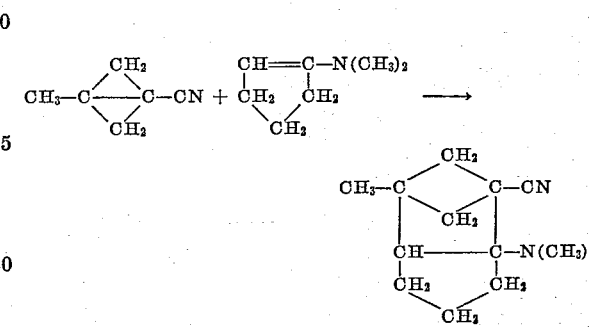

A mixture of 9.3 g. of 1-cyano-3-methylbicyclo[1.1.0]butane and 11.1 g. of 1-dimethylaminocyclopentene was refluxed at atmospheric pressure for five hours. During this time the boiling point of the mixture gradually rose from about 110° C. to 170° C. as the relatively low-boiling reactants were converted to the relatively high-boiling product. Distillation of the mixture gave 13.3 g. of crude product boiling at 85–120° C./2 mm. The crude product was purified via picrate formation. It was added to a solution of 20 g. of picric acid in 400 ml. of ethyl alcohol. The solid that precipitated was separated by filtration and recrystallized from ethyl alcohol. After being washed with ether and air-dried, the crystalline picrate was added to a stirred mixture of 100 ml. of water and 100 ml. of ether, after which 20 ml. of 6 N sodium hydroxide was added with stirring. The ether layer was separated, the aqueous layer was extracted with ether, and the combined ether solutions were extracted with 0.6 N sodium hydroxide and dried over magnesium sulfate. Following removal of the drying agent by filtration, the ether was evaporated and the residue was distilled twice at 1 mm. pressure to give 7.2 g. of 1-cyano-2-dimethylamino-4-methyl-2,3-trimethylene-bicyclo[2.1.1]hexane, $n_D^{25}$ 1.4968.

*Analysis.*—Calcd. for $C_{13}H_{20}N_2$: C, 76.50%; H, 9.80%; N, 13.7%. Found: C, 76.14%, 76.22%; H, 9.93%, 9.96%; N, 13.32%, 13.29%.

The product of this example can also be named as 2-cyano-1-dimethylamino-4-methyloctahydro-2,4-methanopentalene, or as 1-cyano-2-dimethylaminomethyltricyclo[5.1.1.0²,⁶]nonane.

VARIOUS MODIFICATIONS AND EQUIVALENTS OF EXAMPLE II

| Substituted 1-cyanobicyclo[1.1.0]butane | Ethylenically Unsaturated Compound |
|---|---|
| 3-(2-cyclohexylethyl)- | 1-diethylaminocyclooctene. |
| 3-methyl-2-phenyl- | 1-dipentylaminocyclohexene. |

EXAMPLE III

*1-cyano-4-methyl-2-vinylbicyclo[2.1.1]hexane*

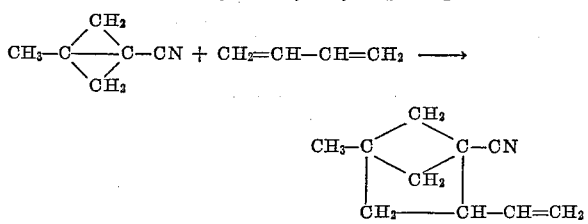

A mixture of 46.5 g. of 1-cyano-3-methylbicyclo-[1.1.0]butane and 135 g. of 1,3-butadiene was heated for eight hours at 145–148° C. and autogenous pressure in a sealed stainless-steel reactor. On distillation of the crude product there was obtained 48 g. (65%) of 1-cyano-4-methyl-2-vinylbicyclo[2.1.1]hexane, B.P. 83–90° C./8 mm. A center cut boiling at 83–85° C./8 mm., $n_D^{25}$ 1.4695, was analyzed.

*Analysis.*—Calcd. for $C_{10}H_{13}N$: C, 81.70%; H, 8.85%; N, 9.53%. Found: C, 81.65%, 81.84%; H, 8.77%, 8.86%; N, 9.41%, 9.23%.

VARIOUS MODIFICATIONS AND EQUIVALENTS OF EXAMPLE III

| Substituted 1-cyanobicyclo[1.1.0]butane | Ethylenically Unsaturated Compound |
|---|---|
| 2-benzyl-2,3-dimethyl-4-tridecyl- | 1,5-hexadiene (biallyl). |
| 3-methyl-2-(2-naphthyl)- | 2,3-dimethyl-1,3-butadiene. |

EXAMPLE IV

*1,2-dicyano-4-methylbicyclo[2.1.1]hexane*

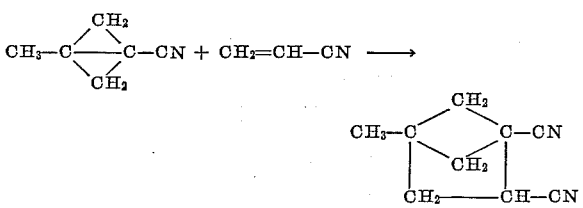

By the method of Example III, 27.9 g. of 1-cyano-3-methylbicyclo[1.1.0]butane and 31.8 g. of acrylonitrile were reacted in the presence of 0.6 g. of phenothiazine at 140° C. and autogenous pressure for eight hours. The product was 20.6 g. (47%) of 1,2-dicyano-4-methylbicyclo[2.1.1]hexane, B.P. 85–95° C./0.05 mm., $n_D^{25}$ 1.4765.

*Analysis.*—Calcd. for $C_9H_{10}N_2$: C, 73.93%; H, 6.90%; N, 19.17%. Found: C, 73.28%, 73.43%; H, 6.81%, 6.84%; N, 18.84%, 19.19%.

VARIOUS MODIFICATIONS AND EQUIVALENTS OF EXAMPLE IV

| Substituted 1-cyanobicyclo[1.1.0]butane | Ethylenically Unsaturated Compound |
|---|---|
| 2,2-diethyl-3-methyl- | Vinyl acetate. |
| 4-decyl-3-isopropyl-2,2-dimethyl- | Methyl methacrylate. |
| 2-benzyl-3-methyl- | Butyl acrylate. |

EXAMPLE V

*1-cyano-4-methyl-2-(p-methoxyphenyl)bicyclo[2.1.1] hexane*

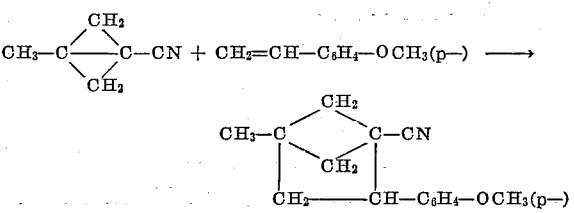

A mixture of 9.3 g. of 1-cyano-3-methylbicyclo[1.1.0] butane, 13.4 g. of p-methoxystyrene, and about 0.02 g. of hydroquinone was heated at atmospheric pressure at about 150° C. for 20 hours. Distillation gave 10.8 g. (48%) of 1-cyano-4-methyl-2-(p-methoxyphenyl) bicyclo[2.1.1]hexane, B.P. 125–135° C./1 mm., $n_D^{25}$ 1.5387. Superheating caused the recorded boiling temperature to rise to 135° C.; the actual boiling point was probably close to 125° C.

*Analysis.*—Calcd. for $C_{15}H_{17}NO$: C, 79.30%; H, 7.50%; N, 6.51%. Found: C, 79.57%, 79.54%; H, 7.62%, 7.61%; N, 7.88%, 7.73%.

EXAMPLE VI

*1-cyano-4-methyl-2-phenylbicyclo[2.1.1]hexane*

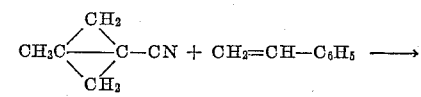

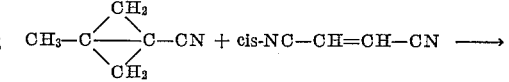

By the method of Example V, 9.3 g. of 1-cyano-3-methylbicyclo[1.1.0]butane and 10.4 g. of freshly distilled styrene were reacted in the presence of about 0.02 g. of hydroquinone at about 150° C. and atmospheric pressure for four hours. The product was 9.3 g. (48%) of 1-cyano-4-methyl-2-phenylbicyclo[2.1.1]hexane, B.P. 106–109° C./1 mm., $n_D^{25}$ 1.5350–1.5360.

*Analysis.*—Calcd. for $C_{14}H_{15}N$: C, 85.28%; H, 7.62%; N, 7.70%. Found: C, 84.33%; H, 7.52%; N, 7.38%.

VARIOUS MODIFICATIONS AND EQUIVALENTS OF EXAMPLES V AND VI

| Substituted 1-cyanobicyclo[1.1.0]butane | Ethylenically Un-saturated Compound |
|---|---|
| 2,2-dimethyl-3-(5-nonyl)- | p-Isopentyloxystyrene. |
| 2,2-di-(n-butyl)-3,4-dimethyl- | m-Methylstyrene. |
| 3-methyl-2,2-diphenyl- | α-Methylstyrene. |

The following experiments (Examples VII and VIII) illustrate the largely stereospecific nature of the process of this invention, i.e., the predominant formation of a cis-product from a cis-ethylenic reactant and of a trans-product from a trans-reactant. This stereospecificity is believed to be general for all ethylenic reactants capable of existing in cis- and trans- forms.

EXAMPLE VII

*1,2,3-tricyano-4-methylbicyclo[2.1.1]hexane*

A mixture of 9.3 g. of 1-cyano-3-methylbicyclo[1.1.0] butane and 7.8 g. of maleonitrile was heated under nitrogen at about 150° C. and atmospheric pressure for seven hours. A small amount of unreacted maleonitrile was removed from the crude product by heating the latter at 90° C./0.3 mm. The crude product was dissolved in 60 ml. of acetonitrile, the solution was mixed with 80 g. of alumina (Woelm, neutral, activity grade 2⅔), and the crude product was uniformly deposited on the alumina by evaporating the mixture in a rotary drier under reduced pressure. The alumina coated with the product was placed at the top of a column of 500 g. of alumina wetted with n-hexane. The column was eluted in turn with n-hexane, carbon tetrachloride, and methylene chloride. Methylene chloride was by far the most effective solvent for eluting the desired product. Evaporation of the separate eluates gave a total of 6.3 g. of a brown, viscous oil. Unsaturated materials were removed from this product by stirring it with a solution of 19.2 g. of potassium permanganate in 200 ml. of water for two hours at room temperature. The mixture was extracted with two 150-ml. portions of methylene chloride, and the combined extracts were dried over anhydrous magnesium sulfate and evaporated to give 1,2,3-tricyano-4-methylbicyclo[2.1.1]hexane as a crystalline solid. The n-m-r (nuclear-magnetic-resonance) spectrum of the product showed it to be approximately a 3:1 mixture of cis- and trans- isomers. The cis- isomer was isolated by two recrystallizations from chloroform as colorless crystals, M.P. 141–142° C.

Analysis.—Calcd. for $C_{10}H_9N_3$: C, 70.2%; H, 5.29%; N, 24.5%. Found: C, 69.34%, 69.24%; H, 5.22%, 4.90%; N, 24.72%.

The trans- isomer, which is much more soluble in chloroform, can be isolated by slowly evaporating the mother liquor from the above recrystallization. This isomer is obtained as colorless crystals, M.P. 104–111° C.

EXAMPLE VIII

Substitution of fumaronitrile for maleonitrile in Example VII gave approximately a 1:2 mixture of cis- and trans- isomers.

EXAMPLE IX

*2-carboxy-1-cyano-4-methylbicyclo[2.1.1]hexane*

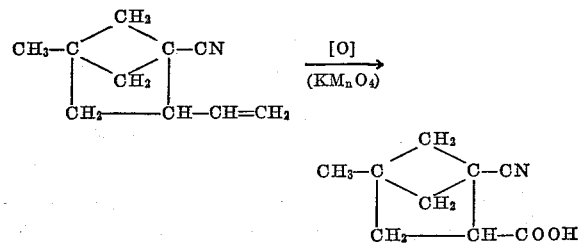

To a mixture of 5.9 g. of 1-cyano-2-vinyl-4-methylbicyclo[2.1.1]hexane (Example III) and 25.3 g. of potassium permanganate at room temperature was added 200 ml. of cold water with stirring. An exothermic reaction took place, and the temperature of the mixture rose rapidly to about 100° C. (Since this procedure is obviously dangerous, a safer procedure would involve gradual addition of the bicyclohexane compound to dilute aqueous potassium permanganate solution, or the reverse addition.) The mixture was cooled to 0° C. in an ice bath. By the time it reached this temperature, the characteristic permanganate color had disappeared. After the mixture had been extracted with two 100-ml. portions of ethyl acetate, it was filtered. The filtrate was acidified with 150 ml. of 2 N hydrochloric acid and extracted with two 200-ml. portions of ethyl acetate. The combined ethyl acetate extracts were dried over magnesium sulfate and evaporated under reduced pressure, the final evaporation conditions being 71° C./7 mm. The colorless, crystalline residue was recrystallized from water to give 2.9 g. (44%) of 2-carboxy-1-cyano-4-methylbicyclo[2.1.1]hexane. A sample was sublimed at 110° C./0.1 mm.; M.P. 130–133.5° C.

Analysis.—Calcd. for $C_9H_{11}NO_2$: C, 65.44%; H, 6.72%; N, 8.48%; N.E., 165. Found: C, 65.48%, 65.65%; H, 6.76%, 6.61%; N, 8.26%; N.E., 159.

The carboxyl group of the product of the foregoing example can be transformed by well-known techniques described heretofore into its functional derivatives without affecting the cyano group in the 1-position. Thus, said carboxyl group, which corresponds to the Y substituent of Formula I, can be transformed into carboxylate salt, halocarbonyl, hydrocarbyloxycarbonyl, carbamoyl, hydrocarbylcarbamoyl or dihydrocarbylcarbamoyl. These transformations are entirely analogous to those discussed in the appropriate remarks following Examples X and XI below.

EXAMPLE X

*1-carboxy-4-methyl-2-phenylbicyclo[2.1.1]hexane*

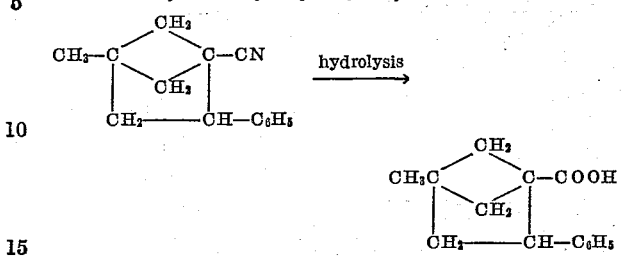

A mixture of 3.8 g. of 1-cyano-4-methyl-2-phenyl-bicyclo[2.1.1]hexane (Example VI), 25 ml. of 6 N sodium hydroxide, and 25 ml. of ethyl alcohol was refluxed for 72 hours. The product mixture was a solution of the sodium salt of 1-carboxy-4-methyl-2-phenylbicyclo[2.1.1]hexane. The alcohol was evaporated, and the residual aqueous solution was acidified with concentrated sulfuric acid and extracted with ethyl ether. The ether solution was dried and evaporated, and the residual material was crystallized from hexane to give 2.45 g. of 1-carboxy-4 - methyl-2 - phenylbicyclo[2.1.1]hexane, M.P. 103–105° C.

Analysis.—Calcd. for $C_{14}H_{16}O_2$: C, 77.74%; H, 7.42%. Found: C, 77.64%, 77.73%; H, 7.34%, 7.36%.

If desired, potassium, rubidium, calcium, or barium hydroxide can be used in place of sodium hydroxide to obtain the corresponding potassium, rubidium, calcium, or barium salt of the indicated acid.

Further, the acid obtained in this example can be converted to esters by conventional techniques. For example, reaction with methanol, n-butanol, or cyclohexanol gives the corresponding methyl, n-butyl, or cyclohexyl ester.

EXAMPLE XI

*1-carboxy-4-methyl-2-(p-methoxyphenyl)-bicyclo[2.1.1]hexane*

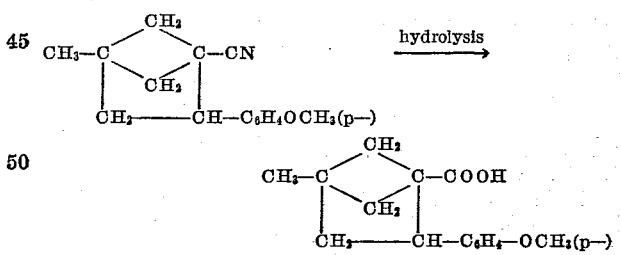

By the method of Example X, 1-cyano-4-methyl-2-(p-methoxyphenyl)bicyclo[2.1.1]hexane (Example V) was hydrolyzed to give a solution of the sodium salt of 1-carboxy-4 - methyl-2 - (p-methoxyphenyl)bicyclo[2.1.1]hexane. Acidification yielded the free acid, M.P. 106–108° C.

Analysis.—Calcd. for $C_{15}H_{18}O_3$: C, 73.20%; H, 7.32%. Found: C, 73.13%, 73.20%; H, 7.37%, 7.40%.

By means of exchange reactions carried out by well-known methods, including the use of cation-exchange resins, the above obtained sodium salt can be converted to other salts, e.g., the ammonium, magnesium, or strontium salt.

Also, the free acid can be treated with thionyl chloride to obtain the acid chloride which can be reacted, in turn, with ammonia or amines to give amides. For example, reaction with ammonia, 2-naphthylamine, diethylamine, or hexamethylenimine gives the amide, 2-naphthylamide, diethylamide, or hexamethylenamide of the acid. Alternatively, one can use the acid fluoride (obtained from the acid and sulfur tetrafluoride) or acid bromide (obtained from the acid and phosphorus tribromide) in place of the acid chloride intermediate.

Alternatively, amides can be made directly from the acid by forming a salt with ammonia or an amine and dehydrating the salt by heating to form the amide, e.g., the amide, methylamide, or dimethylamide can be obtained in this manner from ammonia, methylamine, or dimethylamine.

The bicyclo[1.1.0]butane starting materials for the process of this invention can be prepared by the method disclosed in my copending, coassigned patent application Ser. No. 282,867, filed May 24, 1963. Briefly, this process comprises reacting a 1-cyano-3-alkylenecyclobutane with hydrogen iodide to produce a 1-cyano-3-alkyl-3-iodocyclobutane which is converted, in turn, to the desired 1-cyano-3-alkylbicyclo[1.1.0]butane by reaction with an alkali metal hydride.

The new products of this invention are generically useful as plasticizers as illustrated by the following example.

EXAMPLE A

A solution of 3 g. of polyvinyl chloride in 30 ml. of tetrahydrofuran was divided into three equal portions. To one portion was added 0.5 part of 1-cyano-4-methyl-2-(p-methoxyphenyl)bicyclo[2.1.1]hexane, and to another portion was added 0.5 g. of 1-cyano-4-methyl-2-vinylbicyclo[2.1.1]hexane. Clear films were cast from the three solutions by conventional techniques. The films containing the 1-cyanobicyclo[2.1.1]hexanes were limp and supple, whereas the unmodified film was quite stiff.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound of the formula

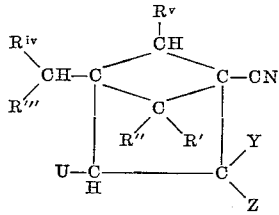

wherein R', R", R''', R$^{iv}$, and R$^v$ are hydrogen or C$_1$–C$_{18}$ hydrocarbyl groups free of aliphatic carbon-to-carbon unsaturation; Y is hydrogen, hydrocarbyl groups of from 1 to 12 carbon atoms free of acetylenic and allenic type unsaturation, lower alkoxyhydrocarbyl groups free of acetylenic and allenic type unsaturation, di(lower alkyl) amino, CN, COOH, COOM, CO-Hal, COOQ, CONH$_2$, CONHQ, CONQQ', or lower alkylcarbonyloxy, wherein M is an alkali metal ion or an alkaline-earth metal ion or NH$_4$, Q and Q' each represent C$_1$–C$_{12}$ aliphatically saturated hydrocarbyl groups and can be joined together to form a divalent alkylene group; U is hydrogen, lower alkyl, or cyano provided that Y is cyano; Z is hydrogen or lower alkyl, and provided that when Y is hydrogen or di(lower alkyl)amino, U and Z can be joined together to form a divalent lower alkylene group.

2. A compound as defined in claim 1 wherein R', R", R''', R$^{iv}$, and R$^v$ each contains at most 12 carbon atoms.

3. A compound as defined in claim 1 wherein R' and R" each contains at most 6 carbon atoms, R''', R$^{iv}$ and R$^v$ each represents hydrogen and U represents hydrogen.

4. 1-cyano-4-methylbicyclo[2.1.1]hexane.

5. 1-cyano-2-dimethylamino-4-methyl - 2,3 - trimethylenebicyclo[2.1.1]hexane.

6. 1-cyano-4-methyl-2-vinylbicyclo[2.1.1]hexane.

7. 1,2-dicyano-4-methylbicyclo[2.1.1]hexane.

8. 1 - cyano - 4 - methyl-2-(p-methoxyphenyl)bicyclo[2.1.1]hexane.

9. 1-cyano-4-methyl-2-phenylbicyclo[2.1.1]hexane.

10. 1,2,3-tricyano-4-methylbicyclo[2.1.1]hexane.

11. Process which comprises contacting and reacting, at a temperature in the range 100° C. to 250° C., a bicyclo[1.1.0]butane of the formula

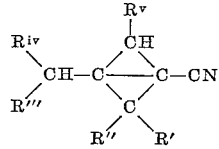

with an ethylenically unsaturated compound of the formula

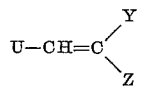

wherein R', R", R''', R$^{iv}$ and R$^v$ each represents hydrogen or C$_1$–C$_{18}$ hydrocarbyl groups free of aliphatic carbon-to-carbon unsaturation;

U is a member of the class consisting of hydrogen, lower alkyl, and cyano when Y is cyano, Y is a member of the class consisting of hydrogen, hydrocarbyl groups free of acetylenic and allenic type unsaturation, lower alkoxyhydrocarbyl groups free of acetylenic and allenic type unsaturation, di(lower alkyl)amino, cyano, lower alkoxycarbonyl and lower alkylcarbonyloxy, Z is a member of the class consisting of hydrogen and lower alkyl, and provided that when Y is hydrogen or di(lower alkyl) amino, U and Z can be joined together to form a divalent lower alkylene group.

12. The process as defined in claim 11 wherein said contacting and reacting step is conducted at a temperature in the range 100° C. to 200° C. and at atmospheric pressure.

References Cited

Wiberg et al.: J.A.C.S., vol. 84, 1962, p. 1596.

CHARLES B. PARKER, Primary Examiner.

JOSEPH P. BRUST, Examiner.